United States Patent
Onodera

(10) Patent No.: US 9,761,381 B2
(45) Date of Patent: Sep. 12, 2017

(54) ELECTROCHEMICAL CELL AND ELECTROCHEMICAL CELL WITH TERMINAL

(71) Applicant: Seiko Instruments Inc., Chiba-shi, Chiba (JP)

(72) Inventor: Hideharu Onodera, Chiba (JP)

(73) Assignee: SEIKO INSTRUMENTS INC., Chiba-Shi, Chiba (JP)

( * ) Notice: Subject to any disclaimer, the term of this patent is extended or adjusted under 35 U.S.C. 154(b) by 0 days.

(21) Appl. No.: 15/018,107

(22) Filed: Feb. 8, 2016

(65) Prior Publication Data

US 2016/0268060 A1    Sep. 15, 2016

(30) Foreign Application Priority Data

Mar. 12, 2015   (JP) .................................. 2015-049207

(51) Int. Cl.
  *H01M 2/30*    (2006.01)
  *H01G 11/30*   (2013.01)
  (Continued)

(52) U.S. Cl.
  CPC ............. *H01G 11/30* (2013.01); *H01G 11/52* (2013.01); *H01G 11/58* (2013.01); *H01G 11/74* (2013.01);
  (Continued)

(58) Field of Classification Search
  CPC ........ H01G 11/30; H01G 11/52; H01G 11/74; H01M 2/30; H01M 2/026; H01M 2/0222;
  (Continued)

(56) References Cited

U.S. PATENT DOCUMENTS

2008/0217078 A1*  9/2008  Kobayashi ............ H01M 2/024
                                          180/65.1
2014/0170484 A1*  6/2014  Fukahori ................. H01M 4/13
                                          429/211

FOREIGN PATENT DOCUMENTS

JP    2004-052100 A    2/2004
JP    2007-311206 A    11/2007
(Continued)

OTHER PUBLICATIONS

Merriam-webster.com Jun. 14, 2017.*
(Continued)

*Primary Examiner* — Mark F Huff
*Assistant Examiner* — Monique Wills
(74) *Attorney, Agent, or Firm* — Brinks Gilson & Lione; G. Peter Nichols

(57) ABSTRACT

A coin type (button type) electrochemical cell is configured of a negative electrode can configuring a negative electrode side and a positive electrode can configuring a positive electrode side. Then, the negative electrode can and the positive electrode can are formed of non-magnetic stainless steel which does not have magnetic properties due to plastic processing. Specifically, the negative electrode can and the positive electrode can are formed by using high manganese stainless steel or SUS305 having a high nickel (Ni) content. In this way, the negative electrode can and the positive electrode can are formed of non-magnetic stainless steel which maintains non-magnetic properties even after being processed into the shape of a coin, and thus it is possible to provide a non-magnetic electrochemical cell, and as a result thereof, it is possible to provide an electrochemical cell which is not affected even at the time of being arranged in the vicinity of a magnet.

8 Claims, 8 Drawing Sheets

(51) Int. Cl.
*H01M 2/02* (2006.01)
*H01M 2/04* (2006.01)
*H01G 11/52* (2013.01)
*H01G 11/58* (2013.01)
*H01G 11/74* (2013.01)

(52) U.S. Cl.
CPC ......... *H01M 2/026* (2013.01); *H01M 2/0222* (2013.01); *H01M 2/0285* (2013.01); *H01M 2/0287* (2013.01); *H01M 2/0413* (2013.01); *H01M 2/30* (2013.01); *H01M 2220/30* (2013.01)

(58) Field of Classification Search
CPC . H01M 2/0285; H01M 2/0287; H01M 2/0413
See application file for complete search history.

(56) References Cited

FOREIGN PATENT DOCUMENTS

| | | |
|---|---|---|
| JP | 2008-293716 A | 12/2008 |
| JP | 2011-210898 A | 10/2011 |

OTHER PUBLICATIONS

Data Sheet (UNS S30500), "AK Steel Appliances, Tank Covers, Kitchen Utensils, Deep Drawn Parts—305 Stainless Steel", *AK Steel*, Apr. 17, 2013, 3 pages.

Extended Search Report in corresponding European Application No. 16151752.9, dated Apr. 1, 2016, 8 pages.

\* cited by examiner

Fig. 7

| PORTION | MATERIAL | MAGNET TEST |
|---|---|---|
| POSITIVE ELECTRODE CAN | SUS329J4L | C |
| | NM17 | A |
| NEGATIVE ELECTRODE CAN | SUS304 | B |
| | NM17 | A |
| ELECTRODE MATERIAL | Ag2O | A |
| | MnO2 | B |
| | LiCoO2 | A |
| | Li4Mn5O12 | B |
| | Li4Ti5O12 | A |
| | Zn | A |
| | C | A |
| | ACTIVATED CARBON | A |
| | Si | B |
| | SiO | A |
| | Li | A |
| | Fe (REFERENCE) | D |

A ... NOT ATTACHED   B ... WEAKLY ATTACHED
C ... ATTACHED   D ... STRONGLY ATTACHED

Fig. 8

| | POSITIVE ELECTRODE CAN PROTECTIVE FILM | NEGATIVE ELECTRODE CAN PROTECTIVE FILM | MAGNET TEST | | CAPACITY RETENTION RATIO (%) |
|---|---|---|---|---|---|
| | | | POSITIVE ELECTRODE CAN SIDE | NEGATIVE ELECTRODE CAN SIDE | |
| EXAMPLE 1 | NM17 NONE | NM17 NONE | A | A | 0 |
| EXAMPLE 2 | NM17 CARBON | NM17 NONE | A | A | 92 |
| COMPARATIVE EXAMPLE | SUS329J4L NONE | SUS304 NONE | C | B | 0 |

A ... NOT ATTACHED   B ... WEAKLY ATTACHED   C ... ATTACHED   D ... STRONGLY ATTACHED

ELECTROCHEMICAL CELL AND ELECTROCHEMICAL CELL WITH TERMINAL

RELATED APPLICATIONS

This application claims priority under 35 U.S.C. §119 to Japanese Patent Application No. 2015-049207 filed on Mar. 12, 2015, the entire content of which is hereby incorporated by reference.

BACKGROUND OF THE INVENTION

Field of the Invention

The present invention relates to an electrochemical cell and an electrochemical cell with terminal, and for example, relates to an electrochemical cell using a coin type metal container and an electrochemical cell with terminal.

Background Art

A so-called coin type battery or an electrochemical cell such as an electric double layered capacitor has been widely used in a memory in various portable devices including a mobile communication apparatus such as a mobile phone or a digital camera, or in a backup power source having a clock function (JP-A-2011-210898).

Such a coin type electrochemical cell includes a container which contains an electrode or an electrolytic solution, and in order to have a function as a collector for inputting and outputting electrons from an electrode, a metal can is generally used as the container.

Among them, a cold rolled steel sheet or a stainless steel plate containing iron as a main constituent is used in a primary battery. An austenite-based stainless steel or an austenite and ferrite-based two phase stainless steel having comparatively excellent corrosion resistance, or a clad plate in which aluminum is crimped into a stainless steel plate is used in a rechargeable secondary battery or an electric double layered capacitor.

However, SUS329J4L which is iron or austenite and ferrite-based two phase stainless steel is a ferromagnetic material.

In addition, austenite-based SUS304 or SUS316L is a non-magnetic material, but a part of the material is changed to martensite having magnetic properties while performing plastic processing with respect to the material into the shape of a coin, and thus the material has magnetic properties.

As a result thereof, the electrochemical cell of the related art in which the stainless steel plate is processed into the shape of a coin has magnetic properties along with the positive electrode can and the negative electrode can.

However, the electrochemical cell may be used as a power source of a motor or an actuator using a magnet or an electromagnet. Then, in order to reduce the size of a device using the electrochemical cell, it is necessary that the electrochemical cell is arranged in the vicinity of the magnet.

For this reason, the container of the electrochemical cell of the related art has magnetic properties, and thus is attached to the magnet and is likely to be affected by the motion of the motor or the actuator.

SUMMARY OF THE INVENTION

An object of the present invention is to provide a non-magnetic electrochemical cell and an electrochemical cell with terminal which are not affected, for example, by the motion of a motor or an actuator.

(1) According to a first aspect of the present invention, there is provided an electrochemical cell including a negative electrode can; a positive electrode can which is sealed with the negative electrode can and an insulating material, and forms a containing portion along with the negative electrode can; a first electrode which is arranged on the negative electrode can in the containing portion; a second electrode which is arranged on the positive electrode can in the containing portion; a separator which is arranged between the first electrode and the second electrode, and insulates both of the first electrode and the second electrode; and an electrolytic solution filling the containing portion, in which the negative electrode can and the positive electrode can have non-magnetic properties.

(2) According to a second aspect of the present invention, there is provided the electrochemical cell according to the first aspect, in which the negative electrode can and the positive electrode can are formed of non-magnetic stainless steel which does not have magnetic properties due to plastic processing.

(3) According to a third aspect of the present invention, there is provided the electrochemical cell according to the second aspect, in which the negative electrode can and the positive electrode can are formed of high manganese stainless steel or high nickel stainless steel.

(4) According to a fourth aspect of the present invention, there is provided the electrochemical cell according to any one of the first aspect to the third aspect, in which the negative electrode can and the positive electrode can are configured of a bottom portion and a side surface portion, and a conductive protective film having corrosion resistance with respect to the electrolytic solution is formed on the entire inner bottom surface of the bottom portion of at least one of the negative electrode can and the positive electrode can, which is in contact with the electrolytic solution.

(5) According to a fifth aspect of the present invention, there is provided the electrochemical cell according to the fourth aspect, in which the protective film is formed up to an inner side surface of the side surface portion.

(6) According to a sixth aspect of the present invention, there is provided the electrochemical cell according to the fourth aspect or the fifth aspect, in which the protective film mainly contains any one of carbon, aluminum, conductive DLC, and a conductive polymer.

(7) According to a seventh aspect of the present invention, there is provided an electrochemical cell with terminal including the electrochemical cell according to any one of the first aspect to the sixth aspect; a positive electrode terminal; and a negative electrode terminal, in which the positive electrode terminal and the negative electrode terminal have non-magnetic properties.

(8) According to an eighth aspect of the present invention, there is provided the electrochemical cell with terminal according to the seventh aspect, in which the positive electrode terminal and the negative electrode terminal are formed of non-magnetic stainless steel which does not have magnetic properties due to plastic processing.

(1) According to the present invention, the negative electrode can and the positive electrode can have non-magnetic properties, and thus it is possible to obtain a non-magnetic electrochemical cell which is not affected by the motion of a motor or an actuator.

(2) According to the fourth aspect to the sixth aspect of the present invention, a conductive protective film having corrosion resistance is formed, and thus it is possible to ensure sufficient corrosion resistance in the non-magnetic electrochemical cell.

(3) According to the seventh aspect and the eighth aspect of the present invention, the terminal attached to the non-magnetic electrochemical cell is also formed of the non-magnetic material, and thus it is possible to obtain a non-magnetic electrochemical cell with terminal.

BRIEF DESCRIPTION OF THE DRAWINGS

FIG. 7 is an explanatory diagram illustrating a test result of whether or not a magnet is attached to an electrochemical cell.

FIG. 8 is an explanatory diagram illustrating a configuration and an evaluation result of each example and a comparative example.

DETAILED DESCRIPTION OF THE INVENTION

Figure 1:
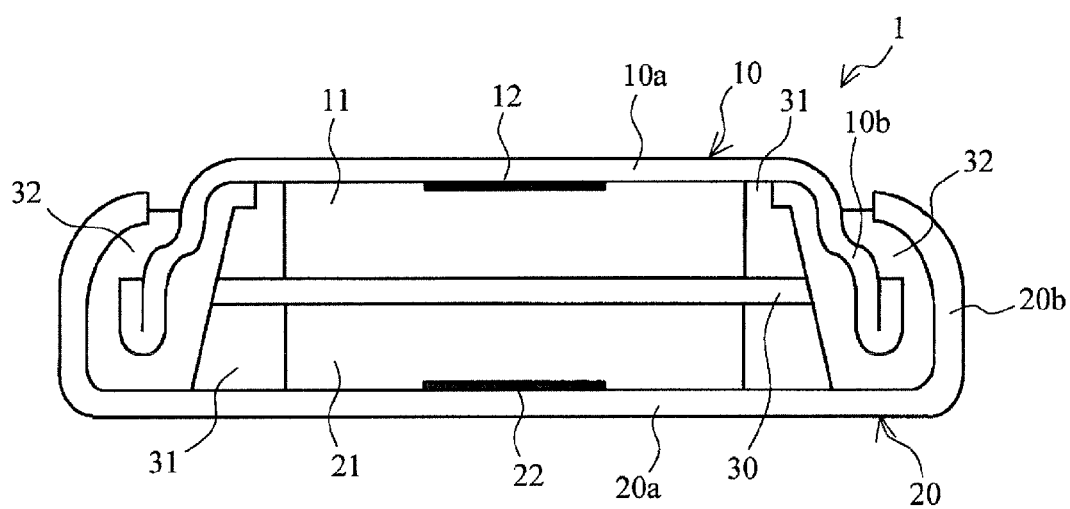
FIG. 1 is a sectional configuration diagram of an electrochemical cell (an electric double layered capacitor) according to a first embodiment.

Hereinafter, preferred embodiments of an electrochemical cell of the present invention will be described in detail with reference to FIG. 1 to FIG. 8.

(1) Outline of Embodiment

In this embodiment, a coin type (a button type) electrochemical cell is configured of a negative electrode can 10 configuring a negative electrode side and a positive electrode can 20 configuring a positive electrode side.

Then, the negative electrode can 10 and the positive electrode can 20 are formed of non-magnetic stainless steel which does not have magnetic properties due to plastic processing. Specifically, the negative electrode can 10 and the positive electrode can 20 are formed by using a high manganese stainless steel or SUS305 having a high nickel (Ni) content.

In this way, the negative electrode can 10 and the positive electrode can 20 are formed by using the non-magnetic stainless steel which maintains non-magnetic properties even after being processed into the shape of a coin, and thus it is possible to provide a non-magnetic electrochemical cell, and as a result thereof, it is possible to provide an electrochemical cell which is not affected even at the time of being arranged in the vicinity of a magnet.

Furthermore, the non-magnetic stainless steel which maintains non-magnetic properties even after the processing has lower corrosion resistance than SUS329J4L which has been used in the positive electrode can of the related art.

Therefore, in this embodiment, in order to further increase corrosion resistance, the can of both electrodes is formed to have non-magnetic properties, and a conductive protective film is formed on the surface of one or both of the negative electrode can 10 and positive electrode can 20 formed of the non-magnetic stainless steel, which is in contact with an electrolytic solution and has corrosion resistance with respect to the electrolytic solution.

Furthermore, when the conductive protective film is formed on the surface of any one of the negative electrode can 10 and positive electrode can 20, it is preferable that the conductive protective film is formed on the surface of the positive electrode can in which higher corrosion resistance is required.

Each of the negative electrode can 10 and the positive electrode can 20 includes a side surface (a circumferential surface) which is continuous to a bottom surface, and the circumferential surface is sealed with a gasket which is an insulating material, and thus in order to ensure corrosion resistance even when the electrolytic solution temporarily enters a side surface portion due to impact or expansion even though the electrolytic solution is not in contact with the side surface in principle, it is preferable that the conductive protective film is also formed on the side surface (the circumferential surface).

Any one of a film formed of a mixture of carbon and a resin, an aluminum film, a conductive diamond-like carbon (DLC) film, a conductive polymer film, and the like is used as the conductive protective film.

(2) Details of Embodiment

Various electrochemical cells such as a silver oxide battery, an alkali manganese battery, a lithium primary battery, a lithium secondary battery, and an electric double layered capacitor are able to be applied as an electrochemical cell 1 of this embodiment.

FIG. 1 is a sectional configuration diagram of a coin type electric double layered capacitor (an electrochemical cell) 1 to which this embodiment is applied.

The electric double layered capacitor 1 has a coin type (a button type) outer shape, and includes the negative electrode can 10 which functions as a negative electrode collector and the positive electrode can 20 which functions as a positive electrode collector.

A first electrode 11, a second electrode 21, a separator 30, an electrolytic solution 31, and the like are sealed with a gasket 32.

The negative electrode can 10 includes a circular bottom portion 10a and a side surface portion 10b continuously connected to the outer circumference of the bottom portion 10a, and the negative electrode can 10 is a disk-like non-magnetic metal container as a whole in which a concave portion including a circular opening portion is formed.

The negative electrode can 10 functions as a lid of the electric double layered capacitor 1.

An opening end side of the side surface portion 10b of the negative electrode can 10 is inserted into a concave portion (a groove) which is formed in a thick portion of the annular (doughnut-like) gasket 32.

The gasket 32, for example, is formed of a resin, and is arranged between the positive electrode can 20 and the negative electrode can 10 over the entire circumference of an opening portion of the positive electrode can 20. The gasket 32 hermetically seals the electrolytic solution or the like in the electric double layered capacitor 1, and insulates the positive electrode can 20 from the negative electrode can 10.

The positive electrode can 20 includes a circular bottom portion 20a and a side surface portion 20b continuously connected to the outer circumference of the bottom portion 20a, and the positive electrode can 20 is a disk-like non-magnetic metal container as a whole in which a concave portion including a circular opening portion is formed. The positive electrode can 20 functions as an outer case of the electric double layered capacitor 1.

The opening portion of the side surface portion 20b is formed such that the diameter of the opening portion is greater than the outer diameter of the gasket 32, and the side surface portion 20b is sealed by being caulked from the outer circumference side in a state where the gasket 32 inserted into the negative electrode can 10 is in contact with the bottom portion 20a of the positive electrode can 20.

Furthermore, the material forming the negative electrode can 10 and the positive electrode can 20 in this embodiment will be described below.

The circular first electrode 11 is connected to the inner bottom surface of the bottom portion 10a of the negative electrode can 10 by a conductive adhesive agent 12, and the circular second electrode 21 is connected to the inner bottom surface of the bottom portion 20a of the positive electrode can 20 by a conductive adhesive agent 22. In this embodiment, the first electrode 11 and the second electrode 21 adhere to the bottom portion 10a of the negative electrode can 10 and the bottom portion 20a of the positive electrode can 20.

A separator 30 configured of an insulating material is arranged between the first electrode 11 and the second electrode 21. That is, the surface of the first electrode 11 which does not adhere to the negative electrode can 10 and the surface of the second electrode 21 which does not adhere to the positive electrode can 20 are arranged to face each other through the separator 30.

In addition, the electric double layered capacitor 1 which is sealed with the negative electrode can 10 and the positive electrode can 20 is filled with an electrolytic solution 31.

Various known materials are able to be used in the first electrode 11, the second electrode 21, the separator 30, and the electrolytic solution 31, and in this embodiment, the following materials are used as an example.

That is, activated carbon, carbon black, and a mixture of PTFE are used in both of the first electrode 11 and the second electrode 21.

A polyolefin fine porous film is used in the separator 30.

In addition, a mixture of a nonaqueous solvent and an electrolyte is used in the electrolytic solution 31.

In addition, various resins such as polyethylene, polypropylene, polyphenylene sulfide, and polyether ether ketone are used in the gasket 32.

Next, a metal material forming the negative electrode can 10 and the positive electrode can 20 will be described.

Both of the negative electrode can 10 and the positive electrode can 20 are formed of non-magnetic stainless steel which maintains non-magnetic properties even after being processed, and both of the negative electrode can 10 and the positive electrode can 20 may be formed of the same material or may be formed of different materials. The negative electrode can 10 and the positive electrode can 20, for example, are formed by using high manganese stainless steel or SUS305 having a high nickel content. For example, the following stainless steel plate is commercially available as a non-magnetic stainless steel plate.

(1) "NAS NM15M" and "NAS NM17" manufactured by Nas Stainless Steel Strip MFG. Co., Ltd.

Both of "NAS NM15M" and "NAS NM17" are high manganese austenite stainless steel, and the chemical components thereof (unit (w %)) are as follows.

(a) "NAS NM15M"

C: 0.040 to 0.090, Si: ≤0.90, Mn: 14.00 to 15.00, P: ≤0.045, S: ≤0.015, Ni: 4.00 to 4.60, Cr: 16.50 to 17.50, and N: 0.30 to 0.35

(b) "NAS NM17"

C: ≤0.10, Si: ≤1.00, Mn: 16.00 to 17.00, P: ≤0.045, S: ≤0.015, Ni: 7.00 to 8.00, Cr: 16.00 to 18.00, and N: ≤0.20

(2) "SUS305M" manufactured by Tokushu Kinzoku Excel Co., Ltd.

"SUS305M" is high nickel austenite stainless steel, and the chemical components thereof (unit (%)) are as follows.

C: 0.07 to 0.09, Si: 0.60 to 1.00, Mn: 1.40 to 1.80, P: ≤0.045, S: ≤0.030, Cr: 18.00 to 19.00, and Ni: 12.00 to 13.00

(3) "SUS XM7", "SUS 305M1", and "SUS 305M3" manufactured by Nisshin Steel Co., Ltd.

"SUS XM7", "SUS 305M1", and "SUS 305M3" are high nickel austenite stainless steel, and the chemical components thereof (unit (%)) are as follows.

(a) "SUS XM7"

C: 0.035, Si: 0.55, Mn: 1.80, P: 0.025, S: 0.004, Ni: 9.40, Cr: 18.25, Mo: 0.12, Cu: 3.20, and N: 0.03

(b) "SUS 305M1"

C: 0.04, Si: 0.82, Mn: 3.19, P: 0.021, S: 0.004, Ni: 11.76, and Cr: 16.1

(c) "SUS 305M3"

C: 0.060, Si: 0.58, Mn: 2.93, P: 0.032, S: 0.004, Ni: 12.24, Cr: 18.72, and N: 0.150

Each stainless steel exemplified as described above is merely an example, other chemical components and other products of other companies are able to be used insofar as non-magnetic stainless steel is used even after the negative electrode can 10 and the positive electrode can 20 are processed by a press. In addition, a clad plate in which aluminum is crimped into non-magnetic stainless steel may be used.

Next, other embodiments will be described.

In a first embodiment, a case is described in which the negative electrode can 10 and the positive electrode can 20 are processed by using high manganese austenite stainless steel or high nickel austenite stainless steel which is non-magnetic stainless steel maintaining non-magnetic properties even after plastic processing, and thus the non-magnetic electrochemical cell 1 is configured as a whole.

However, the high manganese austenite stainless steel or the high nickel austenite stainless steel has lower corrosion resistance than SUS329J4L which has been used in the positive electrode can of the related art.

Therefore, in other embodiments, in order to further increase corrosion resistance, the negative electrode can 10 and the positive electrode can 20 are formed to have non-magnetic properties, and the conductive protective film having corrosion resistance with respect to an electrolytic solution 31 is formed on inner side surface of the bottom portions 10a and 20a which is in contact with the electrolytic solution 31, and thus the corrosion resistance of both of the electrode cans 10 and 20 increases.

Any one of carbon, aluminum, conductive diamond-like carbon (DLC), and a conductive polymer is used as the material of the protective film.

The protective film is formed on at least one of the negative electrode can 10 and the positive electrode can 20, and when the protective film is formed on one of the negative electrode can 10 and the positive electrode can 20, it is preferable that the protective film is formed on the positive electrode can 20 side in which higher corrosion resistance is required. When the protective film is formed on both of the negative electrode can and the positive electrode can, the same protective film or different protective films may be used among the protective films described above.

The protective film electrically connects the negative electrode can 10 to the first electrode 11 or the positive electrode can 20 to the second electrode 21, and thus a material having excellent conductivity may be used in the protective film.

In addition, it is preferable that the protective film is not decomposed by the electrolytic solution 31 or a charging current.

In addition, a film which does not absorb the electrolytic solution 31 or does not have a pin hole is preferable as the protective film. When the protective film has the pin hole, the electrolytic solution 31 is in contact with the negative electrode can 10 or the positive electrode can 20, and thus corrosion may occur. In order to reduce the number of pin holes, it is necessary that the protective film is formed to be thick. In contrast, when the protective film is excessively thick, the volume of the protective film with respect to a containing portion increases, and thus the amount of electrode which is able to be contained decreases and the capacitance decreases. For this reason, the film thickness of the protective film is preferably 0.1 μm to 100 μm, and is more preferably 2 μm to 60 μm. In addition, it is preferable that the protective film has non-magnetic properties.

A carbon protective film, for example, is a film formed by applying a paste formed of a phenol resin, carbon, and a solvent onto a coating surface, and by thermally curing the paste. Graphite, carbon black, and the like are able to be used as the carbon. In addition, various carbon materials are able to be used in a plurality of combinations. Carbon having non-magnetic properties is used as the carbon.

An aluminum protective film, for example, is formed by evaporating aluminum. An aluminum alloy in which elements such as Mg, Mn, Si, and Cu are contained in a minute amount is able to be used as the aluminum, in addition to pure aluminum in which aluminum is contained in the amount of greater than or equal to 99% at a composition ratio. It is preferable that the aluminum has non-magnetic properties.

A conductive DLC protective film is an amorphous thin film having a diamond bond or a graphite bond. The thin film, for example, is formed by performing plasma processing with respect to raw material gas of hydrocarbon such as acetylene gas or benzene gas, and by using CVD or PVD. It is preferable that the DLC film has non-magnetic properties.

A conductive polymer protective film is formed of a high molecular compound having electrical conductivity, and for example, polythiophenes, polyacetylenes, or the like is able to be used in the conductive polymer protective film. In addition, a film (PEDOT/PSS) formed by applying a water dispersion liquid having poly(styrene sulfonate) (PSS) as a dopant for increasing conductivity to poly(3,4-ethylene dioxythiophene)(PEDOT), and by drying the mixture is able to be used as the conductive polymer protective film. The conductive polymer is able to form a film by applying the conductive polymer which is dispersed in water or an organic solvent, and by curing or drying the conductive polymer.

In addition to these materials, it is preferable that various additives are used by being suitably added in order to improve coating properties or conductivity. It is preferable that the conductive polymer film has non-magnetic properties.

Figure 2:
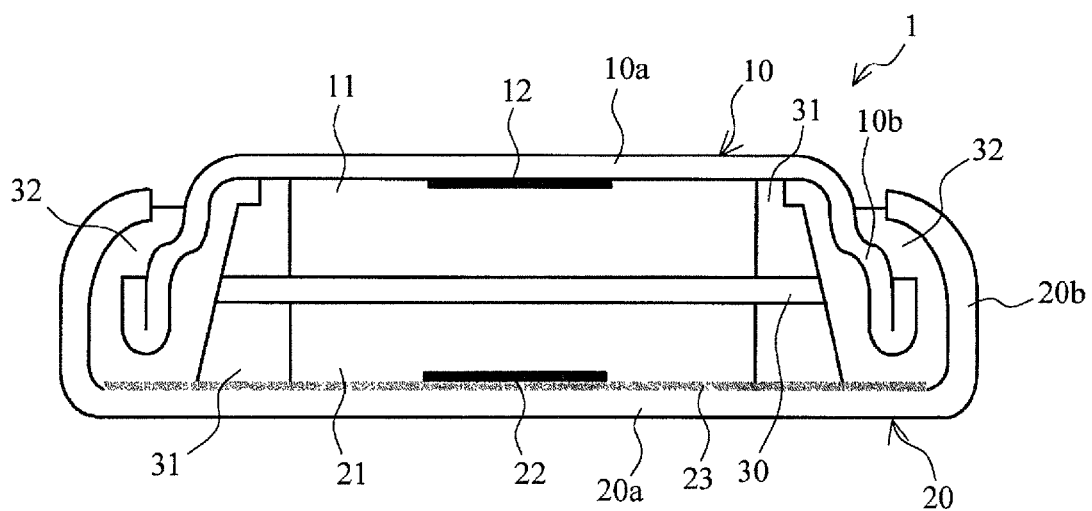
FIG. 2 is a sectional configuration diagram of an electrochemical cell (an electric double layered capacitor) according to a second embodiment.

FIG. 2 illustrates the sectional configuration of the electric double layered capacitor 1 according to a second embodiment.

In the electric double layered capacitor 1 of the second embodiment, a protective film 23 is formed on the inner bottom surface of the bottom portion 20a of the positive electrode can 20 having high necessity for corrosion resistance.

According to the second embodiment, the conductive protective film 23 is formed on the inner bottom surface of the bottom portion 20a of the positive electrode can 20, and thus the contact area between the positive electrode can 20 and the electrolytic solution 31 decreases, and the corrosion of the positive electrode can 20 is able to be prevented.

Figure 3:
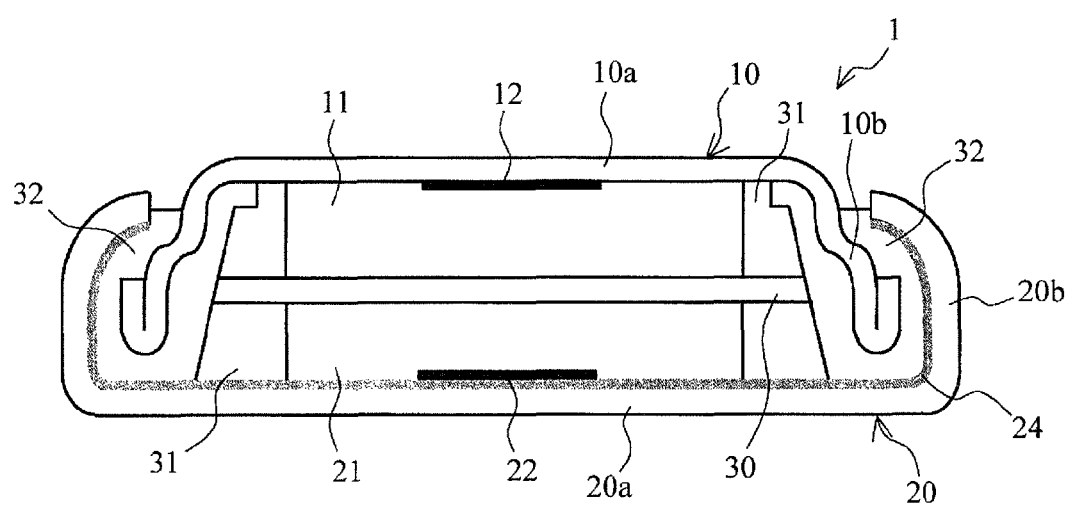
FIG. 3 is a sectional configuration diagram of an electrochemical cell (an electric double layered capacitor) according to a third embodiment.

FIG. 3 illustrates the sectional configuration of the electric double layered capacitor 1 according to a third embodiment.

In the electric double layered capacitor 1 of the second embodiment, a case is described in which the protective film 23 is formed on the inner bottom surface of the bottom portion 20a of the positive electrode can 20, and in the electric double layered capacitor 1 of the third embodiment, the forming range of the protective film 23 is further widened.

As illustrated in FIG. 3, a protective film 24 is formed on the positive electrode can 20 of the electric double layered capacitor 1 such that the protective film 24 extends not only to the inner bottom surface of the bottom portion 20a but also to the inner side surface of the side surface portion 20b.

According to the third embodiment, the forming region of the protective film extends not only to the inner bottom surface of the bottom portion 20a but also to the inner side surface of the side surface portion 20b, and thus even when the electrolytic solution 31 enters the inner side surface through the gasket 32, the corrosion of the positive electrode can 20 as the positive electrode collector is able to be prevented.

Figure 4:
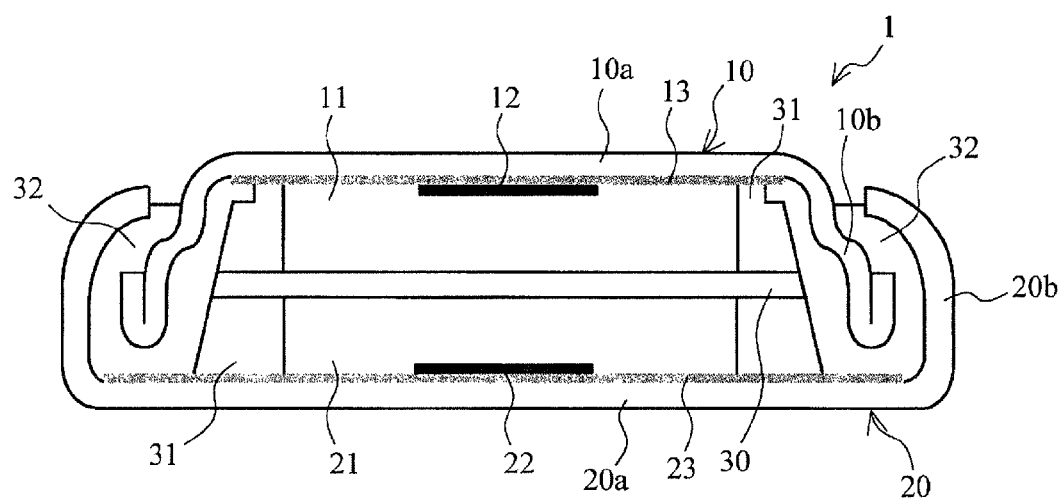
FIG. 4 is a sectional configuration diagram of an electrochemical cell (an electric double layered capacitor) according to a fourth embodiment.

FIG. 4 illustrates the sectional configuration of the electric double layered capacitor 1 according to a fourth embodiment.

In the electric double layered capacitor 1 of the fourth embodiment, the protective film 23 is formed on the entire inner bottom surface of the bottom portion 20a of the positive electrode can 20, and a protective film 13 is also formed on the entire inner bottom surface of the bottom portion 10a of the negative electrode can 10.

According to the electric double layered capacitor 1 of the fourth embodiment, even when the positive electrode and the negative electrode are reversely connected (charged) erroneously, the corrosion of the reversely connected negative electrode can 10 is able to be prevented.

Figure 5:
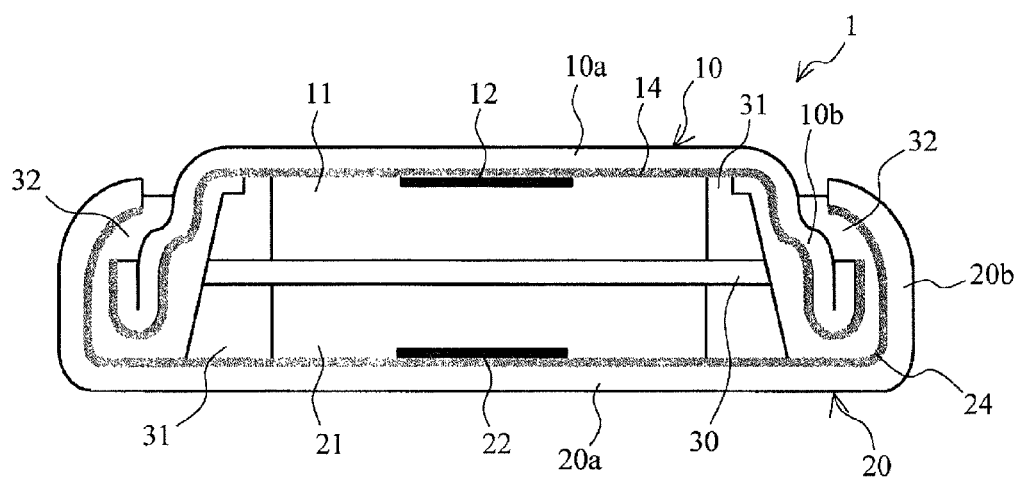
FIG. 5 is a sectional configuration diagram of an electrochemical cell (an electric double layered capacitor) according to a fifth embodiment.

FIG. 5 illustrates the sectional configuration of the electric double layered capacitor 1 according to a fifth embodiment.

In the electric double layered capacitor 1 of the fifth embodiment, the protective film 24 is formed on the positive electrode can 20 such that the protective film 24 extends not only to the entire inner bottom surface of the bottom portion 20a but also to the inner side surface of the side surface portion 20b.

In addition, a protective film 14 is formed on the negative electrode can 10 such that the protective film 14 extends to the entire inner bottom surface of the bottom portion 10a, the inner side surface of the side surface portion 10b, and the outer side surface of a folding back portion which is continuous to the inner side surface. In the forming range of the protective film 14, the protective film 14 is able to be formed immediately in front of the folding back portion, that is, the protective film 14 is not able to be formed on the outer side surface.

According to the electric double layered capacitor 1 of the fifth embodiment, it is possible to further increase corrosion resistance at the time of reversely connecting (charging) the positive electrode and the negative electrode erroneously.

Figure 6:
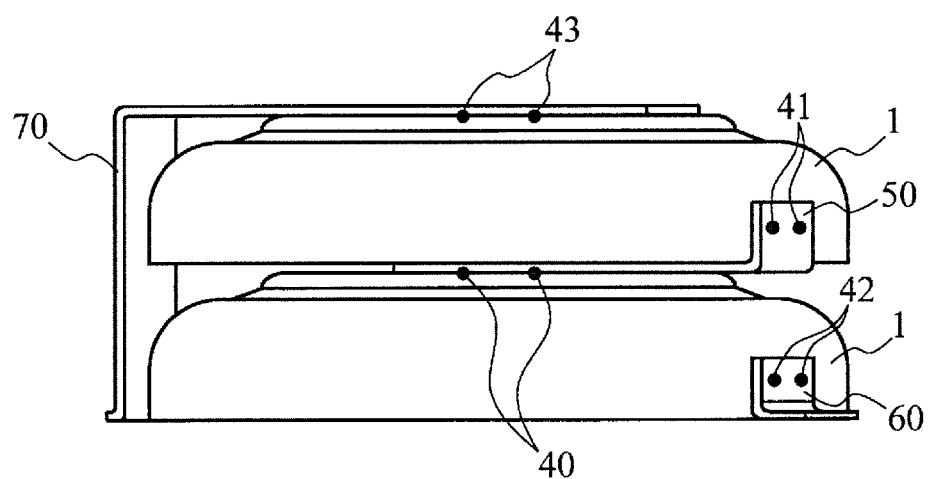
FIG. 6 is a side view of an electrochemical cell with terminal in which a terminal is attached to an electrochemical cell of the present invention.

FIG. 6 illustrates a configuration of an electrochemical cell with terminal in which a terminal is attached to the electrochemical cell of each of the embodiments of the present invention. As an example, an electrochemical cell module is exemplified in which two electrochemical cells 1 are connected in series through a connection member 50.

A flat surface portion of a negative electrode can of a cell on a lower side and a side surface portion of a positive electrode can of a cell on an upper side are welded to each other through one connection member 50. That is, the connection member 50 is configured of a flat plate portion and a curved portion, the flat plate portion and the flat surface portion of the negative electrode can of the cell on the lower side are welded to each other through a welding point 40, and the curved portion and the side surface portion of the positive electrode can of the cell on the upper side are welded to each other through a welding point 41.

In addition, a positive electrode terminal 60 is welded to the side surface portion of the positive electrode can of the cell on the lower side through a welding point 42, and a negative electrode terminal 70 is welded to the flat surface portion of the negative electrode can of the cell on the upper side through a welding point 43.

In the electrochemical cell with terminal, not only each of the electrochemical cells 1 but also all of the connection member 50, the positive electrode terminal 60, and the negative electrode terminal 70 are formed of a non-magnetic material. Accordingly, the entire electrochemical cell with terminal has non-magnetic properties.

In particular, it is preferable that various non-magnetic stainless steels described above which do not have magnetic properties due to processing are used as the non-magnetic material.

Next, examples of the electrochemical cell of the present invention will be described.

First, in the example, a samarium cobalt magnet having a comparatively strong magnetic force is brought into contact with the material of each of the positive electrode can or the negative electrode can, and the electrode material used in the electrochemical cell such as a primary battery or a secondary battery, and an electric double layered capacitor, and thus a test of whether or not each of the materials is attached to the magnet is performed.

FIG. 7 illustrates a test result of whether or not the material is attached to the magnet.

In FIG. 7, a case where the material is not attached to the magnet is evaluated as "A", a case where the material is weakly attached to the magnet is evaluated as "B", a case where the material is attached to the magnet is evaluated as "C", and a case where the material is strongly attached to the magnet is evaluated as "D".

In FIG. 7, stainless steel of the positive electrode can and the negative electrode can is evaluated after processing the can. In addition, the electrode material is evaluated by mixing a powder of each of the materials except for Li and a resin at a mass ratio of 9:1, and then by molding the mixture into the shape of a pellet, and by bringing the magnet into contact with the mixture. Li is evaluated by directly bringing the magnet into contact with a Li foil.

The results with respect to the material of the positive electrode can and the negative electrode can are as follows. First, SUS329J4L is weakly attached to the magnet in a plate state, but is attached to the magnet after being processed into the positive electrode can. In addition, SUS304 is not attached to the magnet in a plate state, but is weakly attached to the magnet after being processed into the negative electrode can.

In contrast, NM17 which is non-magnetic stainless steel is not attached to the magnet in a plate state after being processed into the positive electrode can and the negative electrode can.

The results with respect to various electrode materials are as follows. First, $Ag_2O$ and Zn which are the materials of the silver oxide battery are not attached to the magnet. In addition, among positive electrode materials of the lithium primary battery or the lithium secondary battery, $LiCoO_2$ and $Li_4Ti_5O_{12}$ are not attached to the magnet, but $MnO_2$ or $Li_4Mn_5O_{12}$ is weakly attached to the magnet. Among negative electrode materials of the battery, Li, C (carbon black and graphite) and SiO are not attached to the magnet, but Si is weakly attached to the magnet. Activated carbon which is the material of the electric double layered capacitor is not attached to the magnet.

In addition, as a reference, when the magnet is arranged to be close to Fe, Fe is strongly attached to the magnet.

All of the electrode materials are less likely to be attached to the magnet than Fe, but it is more preferable that a material which is not attached to the magnet is used.

Furthermore, other members used in this example are also examined and evaluated. Various resins such as polyolefin or PTFE are used in the separator 30, and all of these resins have non-magnetic properties. In addition, an aqueous solution of NaOH or an aqueous solution of KOH used in an alkali primary battery such as a silver oxide battery, a nonaqueous electrolytic solution in which a supporting salt such as $LiPF_6$, $TEABF_4$, and $SBPBF_4$ is dissolved in a nonaqueous solvent which is used in a lithium secondary battery, an electric double layered capacitor, or the like, various ion liquids, and the like are known as the electrolytic solution 31, and even when the magnet is brought into contact with these solutions, the magnet becomes wet with these solutions but does not draw the solution to be attached to the magnet. In addition, various resins such as polyethylene, polypropylene, polyphenylene sulfide, and polyether ether ketone are used as the gasket 32 which is the insulating material, and all of these materials of the gasket are not attached to the magnet.

Subsequently, in the electric double layered capacitor 1 manufactured according to the configuration of each of the embodiments of the present invention, the presence or absence of the attachment with respect to the magnet and electrical properties are evaluated.

EXAMPLE 1

First, as Example 1, the electric double layered capacitor 1 is manufactured according to the first embodiment. Specifically, the electric double layered capacitor 1 is manufactured as follows.

The positive electrode can 20 and the negative electrode can 10 are subjected to press processing by using a stainless steel plate, NAS NM17 manufactured by Nas Stainless Steel Strip MFG. Co., Ltd. The negative electrode can 10 includes the circular bottom portion 10a and the side surface portion 10b continuously connected to the outer circumference of the bottom portion 10a, and the concave portion including the circular opening portion is formed in the negative electrode can 10. The positive electrode can 20 includes the circular bottom portion 20*a* and the side surface portion 20*b* continuously connected to the outer circumference of the bottom portion 20*a*, and the concave portion including the circular opening portion is formed in the positive electrode can 20. The opening portion of the side surface portion 20*b* is formed such that the diameter of the opening portion is greater than the outer diameter of the gasket 32, and, the side surface portion 20*b* is sealed by being caulked from the outer circumference side in a state where the gasket 32 inserted into the negative electrode can 10 is in contact with the bottom portion 20*a* of the positive electrode can 20.

The first electrode 11 and the second electrode 21 are formed by molding a powder in which activated carbon, carbon black, and polytetrafluoroethylene are mixed, by allowing the molded powder to adhere to the positive electrode can 20 and the negative electrode can 10 through the conductive adhesive agents 12 and 22 formed of carbon black and a resin, and by drying the molded powder. A polyolefin fine porous film is used as the separator 30. After the molded powder is dried, caulking and sealing are performed by injecting the electrolytic solution 31 under an environment of a low dew point, and thus the electric double layered capacitor 1 is manufactured.

EXAMPLE 2

Next, as Example 2, the electric double layered capacitor 1 is manufactured according to the second embodiment. Specifically, the electric double layered capacitor 1 is manufactured by the same method as that in Example 1 except that the protective film 23 formed of carbon is formed on the inner bottom surface of the positive electrode can 20, and then the second electrode 21 adheres thereto through the conductive adhesive agent.

COMPARATIVE EXAMPLE

As a comparative example, the electric double layered capacitor 1 is manufactured by the same method as that in Example 1 except that the negative electrode can is formed of SUS304, and the positive electrode can is formed of SUS329J4L.

FIG. 8 illustrates the configuration and the evaluation result of each of the examples and the comparative example.

Magnet Test

In a magnet test, a samarium cobalt magnet is brought into contact with the electric double layered capacitor 1 on the positive electrode can side and on the negative electrode can side, and a case where the cell is not attached to the magnet is evaluated as "A", a case where the cell is weakly attached to the magnet is evaluated as "B", and a case where the cell is attached to the magnet is evaluated as "C".

In Example 1 and Example 2, all of the cells are not attached to the magnet, but in the comparative example, the cell is attached to the magnet on the positive electrode can side, and the cell is weakly attached to the magnet on the negative electrode can side. In these examples, the non-magnetic electric double layered capacitor 1 is able to be formed as a whole.

Capacity Retention Ratio

In addition, a capacity retention ratio is evaluated as electrical properties according to the following sequence.

(1) Capacitance Measurement 1

The electric double layered capacitor 1 is charged at 2.5 V, and then is discharged at 35 mA/cm² per electrode area, and capacitance C1 is calculated when a discharging voltage is changed from 80% to 40% of a charging voltage.

(2) The electric double layered capacitor 1 is put into a thermostatic tank at 40° C., a power source of +2.5 V (positive connection) is connected to the positive electrode can 20, and the charging is continued for 1 week.

(3) Capacitance Measurement 2

Capacitance C2 is calculated by the same method as that in Capacitance Measurement 1.

(4) A Capacity Retention Ratio is Set to C2/C1.

In Example 1 and the comparative example, the capacity retention ratio is 0, but in Example 2, a high capacity retention ratio of 92% is obtained. This is because the carbon protective film is formed on the positive electrode can 20, and thus the corrosion of the positive electrode can is able to be prevented, and performance deterioration of the cell is able to be prevented. Accordingly, it is possible to form the electric double layered capacitor 1 with high reliability.

What is claimed is:

1. An electrochemical cell, comprising:
a negative electrode can having a bottom portion and a side surface portion;
a positive electrode can having a bottom portion and a side surface portion, with the positive electrode can being sealed with the negative electrode can and an insulating material, to form a containing portion along with the negative electrode can;
a first electrode which is arranged on the negative electrode can in the containing portion;
a second electrode which is arranged on the positive electrode can in the containing portion;
a separator which is arranged between the first electrode and the second electrode, and insulates both of the first electrode and the second electrode; and
an electrolytic solution filling the containing portion,
wherein the negative electrode can and the positive electrode can have non-magnetic properties and wherein an electrically conductive protective film having corrosion resistance with respect to the electrolytic solution is formed on the entire inner bottom surface of the bottom portion of at least one of the negative electrode can and the positive electrode can, which is in contact with the electrolytic solution.

2. The electrochemical cell according to claim 1, wherein the negative electrode can and the positive electrode can are formed of non-magnetic stainless steel which does not have magnetic properties due to plastic processing.

3. The electrochemical cell according to claim 2, wherein the negative electrode can and the positive electrode can are formed of manganese stainless steel or nickel stainless steel.

4. The electrochemical cell according to claim 1, wherein the protective film is formed up to an inner side surface of the side surface portion.

5. The electrochemical cell according to claim 1, wherein the protective film mainly contains any one of carbon, aluminum, conductive DLC, and a conductive polymer.

6. The electrochemical cell according to claim 4, wherein the protective film mainly contains any one of carbon, aluminum, conductive DLC, and a conductive polymer.

7. An electrochemical cell with terminal, comprising:
the electrochemical cell according to claim 1;
a positive electrode terminal; and
a negative electrode terminal,
wherein the positive electrode terminal and the negative electrode terminal have non-magnetic properties.

8. The electrochemical cell with terminal according to claim 7, wherein the positive electrode terminal and the negative electrode terminal are formed of non-magnetic stainless steel which does not have magnetic properties due to plastic processing.

\* \* \* \* \*

UNITED STATES PATENT AND TRADEMARK OFFICE
CERTIFICATE OF CORRECTION

PATENT NO. : 9,761,381 B2
APPLICATION NO. : 15/018107
DATED : September 12, 2017
INVENTOR(S) : Hideharu Onodera It is certified that error appears in the above-identified patent and that said Letters Patent is hereby corrected as shown below:

In the Claims

Claim 6, Column 12, Line 57, please delete "4" and replace with --1--.

Signed and Sealed this
Thirteenth Day of August, 2019

Andrei Iancu
*Director of the United States Patent and Trademark Office*